(12) United States Patent
Tagami et al.

(10) Patent No.: US 12,533,786 B2
(45) Date of Patent: Jan. 27, 2026

(54) WORK MACHINE

(71) Applicant: Koki Holdings Co., Ltd., Tokyo (JP)

(72) Inventors: Hiroyuki Tagami, Ibaraki (JP); Naoto Ichihashi, Ibaraki (JP)

(73) Assignee: Koki Holdings Co., Ltd., Tokyo (JP)

( * ) Notice: Subject to any disclaimer, the term of this patent is extended or adjusted under 35 U.S.C. 154(b) by 0 days.

(21) Appl. No.: 18/835,736

(22) PCT Filed: Mar. 10, 2023

(86) PCT No.: PCT/JP2023/009233
§ 371 (c)(1),
(2) Date: Aug. 5, 2024

(87) PCT Pub. No.: WO2023/189401
PCT Pub. Date: Oct. 5, 2023

(65) Prior Publication Data
US 2025/0135620 A1 May 1, 2025

(30) Foreign Application Priority Data
Mar. 31, 2022 (JP) .................................. 2022-061289

(51) Int. Cl.
*B25D 17/20* (2006.01)
(52) U.S. Cl.
CPC ...... *B25D 17/20* (2013.01); *B25D 2217/0061* (2013.01); *B25D 2217/0065* (2013.01); *B25D 2250/095* (2013.01)
(58) Field of Classification Search
CPC ............ B25D 17/00; B25D 2217/0061; B25D 2217/0065; B25D 2250/095
See application file for complete search history.

(56) References Cited

U.S. PATENT DOCUMENTS

| 4,192,390 A * | 3/1980 | Wanner | B23Q 11/0046 173/198 |
| 7,047,647 B1 * | 5/2006 | Muller | B23Q 11/0046 30/392 |

(Continued)

FOREIGN PATENT DOCUMENTS

| DE | 102017206975 A1 * | 10/2018 | ........... B23B 45/003 |
| JP | 2010201526 | 9/2010 | |

(Continued)

OTHER PUBLICATIONS

"International Search Report (Form PCT/ISA/210) of PCT/JP2023/009233", mailed on Apr. 11, 2023, with English translation thereof, pp. 1-4.

*Primary Examiner* — Thanh K Truong
*Assistant Examiner* — David G Shutty
(74) *Attorney, Agent, or Firm* — JCIPRNET

(57) ABSTRACT

A work machine includes: a motor; an output shaft, rotated by driving of the motor; a first fan, fixed to and rotating integrally with the output shaft; a second fan, located on one side of the first fan in an axial direction of the output shaft, fixed to and rotating integrally with the output shaft; and a rectification member, accommodating the first and second fans, and, when the output shaft rotates to one side in a rotation direction, causing a first airflow blown out from the first fan and a second airflow blown out from the second fan to join together and flow out toward one side in the axial direction. The rectification member includes a rectification section in which the second airflow is rectified to flow to the one side in the axial direction and is prevented from flowing to the other side in the axial direction.

13 Claims, 9 Drawing Sheets

(56) References Cited

U.S. PATENT DOCUMENTS

| | | | | |
|---|---|---|---|---|
| 7,475,739 B2* | 1/2009 | Wuensch | ........... | B23Q 11/0046 173/171 |
| 7,909,114 B2* | 3/2011 | Nishikawa | ......... | B23Q 11/0046 173/198 |
| 8,529,169 B2* | 9/2013 | Nishikawa | ........... | B23Q 11/006 408/67 |
| 9,943,940 B2* | 4/2018 | Furusawa | ........... | B23Q 11/0046 |
| 10,507,556 B2* | 12/2019 | Machida | ............ | B01D 46/0027 |
| 10,512,997 B2* | 12/2019 | Yoshikane | .............. | B23B 47/34 |
| 10,864,609 B2* | 12/2020 | Mori | ................... | B23Q 11/0071 |
| 11,446,780 B2* | 9/2022 | Mori | ................... | B23Q 11/0046 |
| 11,865,657 B2* | 1/2024 | Yoshikane | ........... | B23Q 11/127 |

FOREIGN PATENT DOCUMENTS

| | | | | |
|---|---|---|---|---|
| JP | 2010201526 A | * | 9/2010 | ............. B23B 47/34 |
| JP | 2020104218 | | 7/2020 | |
| JP | 2021186924 | | 12/2021 | |

\* cited by examiner

WORK MACHINE

CROSS-REFERENCE TO RELATED APPLICATION

This application is a 371 application of the International PCT application serial no. PCT/JP2023/009233, filed on Mar. 10, 2023, which claims the priority benefit of Japan Patent Application No. 2022-061289, filed on Mar. 31, 2022. The entirety of each of the above-mentioned patent applications is hereby incorporated by reference herein and made a part of this specification.

TECHNICAL FIELD

The present invention relates to a work machine.

RELATED ART

In a drilling tool (work machine) described in Patent Document 1 below, a dust collection fan and a cooling fan are provided in an integrally rotatable manner on an output shaft of a motor. As the dust collection fan rotates, dust collection air is generated that flows into the drilling tool from a suction port of the drilling tool. Accordingly, the dust collection air can be generated inside a dust collector connected to the suction port of the drilling tool, and dust can be collected in the dust collector. As the cooling fan rotates, cooling air is generated that flows into the drilling tool, and the motor is cooled by the cooling air.

PRIOR-ART DOCUMENTS

Patent Documents

Patent Document 1: Japanese Patent Laid-open No. 2010-201526

SUMMARY OF THE INVENTION

Problems to Be Solved by the Invention

However, the above drilling tool has room for improvement in the points shown below. That is, a work machine such as a drilling tool includes a heat generation section in addition to the motor. As an example of the heat generation section, a transmission mechanism for transmitting a driving force of the motor to a drill bit is operated by the driving force of the motor. Thus, the transmission mechanism undergoes a temperature rise due to frictional heat during operation. Hence, by improving cooling performance with respect to the transmission mechanism, performance such as durability of the drilling tool can be improved. On the other hand, in the above drilling tool, while a portion of the dust collection air flows to the transmission mechanism side and cools the transmission mechanism, the cooling air is directly exhausted from radially outside the cooling fan to the outside of the drilling tool. That is, the transmission mechanism is cooled by only a portion of the dust collection air. Hence, there is room for improvement in the above drilling tool in terms of efficiently cooling the transmission mechanism.

The present invention takes the above facts into consideration and aims to provide a work machine with improved cooling performance.

Means for Solving the Problems

One or more embodiments of the present invention provide a work machine including: a motor; an output shaft, rotated by driving of the motor; a first fan, fixed to the output shaft and rotating integrally with the output shaft; a second fan, located on one side of the first fan in an axial direction of the output shaft, fixed to the output shaft, and rotating integrally with the output shaft; and a rectification member, accommodating the first fan and the second fan therein, and, when the output shaft rotates to one side in a rotation direction, causing a first airflow blown out from the first fan and a second airflow blown out from the second fan to join together and flow out toward one side in the axial direction. The rectification member includes a rectification section in which the second airflow is rectified so as to flow to the one side in the axial direction and is prevented from flowing to the other side in the axial direction.

One or more embodiments of the present invention provide the following work machine. The first fan and the second fan are centrifugal fans.

One or more embodiments of the present invention provide the following work machine. The rectification section is arranged radially outside the output shaft with respect to at least the second fan, and changes a direction of the second airflow into toward the one side in the axial direction.

One or more embodiments of the present invention provide the following work machine. The rectification section is formed in a rib shape extending along a direction that is inclined to the one side in the axial direction as going toward the one side in the rotation direction as viewed in a radial direction of the output shaft.

One or more embodiments of the present invention provide the following work machine. A rectification extension section extending to the one side in the axial direction is provided at one end in the axial direction of the rectification section. The rectification extension section includes an extension surface connected to the other side surface in the rotation direction of the rectification section and arranged along a plane orthogonal to the rotation direction.

One or more embodiments of the present invention provide the following work machine. The rectification member includes a guide wall. The guide wall is arranged radially outside the output shaft with respect to the first fan and the second fan, and extends in the rotation direction. The rectification section extends radially inward of the output shaft from the guide wall.

One or more embodiments of the present invention provide the following work machine. The work machine includes a housing. The housing includes a first housing section that accommodates the motor and the rectification member and has an air intake port and a dust collection port formed therein, and a second housing section that has an exhaust port formed therein. The rectification member includes a partition wall. The partition wall partitions out, as a second airflow passage, a portion of space on the one side in the axial direction with respect to the second fan. The second airflow passage communicates with the dust collection port, and is arranged at a position where the rectification section and the second airflow passage do not overlap as viewed in the axial direction.

One or more embodiments of the present invention provide the following work machine. A sub rectification section is provided radially outside the first fan. The sub rectification section is arranged on the other side in the rotation direction with respect to the rectification section, and is formed in a rib shape extending along a direction that is inclined to the one side in the axial direction as going toward the one side in the rotation direction as viewed in a radial direction of the output shaft.

One or more embodiments of the present invention provide the following work machine. An inclination angle of one end in the rotation direction of the rectification section with respect to the rotation direction is set larger than an inclination angle of one end in the rotation direction of the sub rectification section with respect to the rotation direction as viewed in the radial direction of the output shaft.

One or more embodiments of the present invention provide the following work machine. A length of the rectification section in the axial direction is set larger than a length of the sub rectification section in the axial direction.

One or more embodiments of the present invention provide the following work machine. An air volume of the first airflow blown out from the first fan is larger than an air volume of the second airflow blown out from the second fan.

One or more embodiments of the present invention provide the following work machine. A dust collector is attached to the housing. The dust collector is configured to include: a suction section, suctioning air around a tip tool and causing the air to flow into the dust collector by dust collection air; and a discharge section, connected to the dust collection port, and causing the dust collection air inside the dust collector to flow out into the first housing section.

One or more embodiments of the present invention provide the following work machine. A transmission mechanism that transmits a driving force of the motor to a tip tool is accommodated in the second housing section.

Effects of the Invention

According to one or more embodiments of the present invention, cooling performance of the work machine can be improved.

DESCRIPTION OF THE EMBODIMENTS

Figure 1:
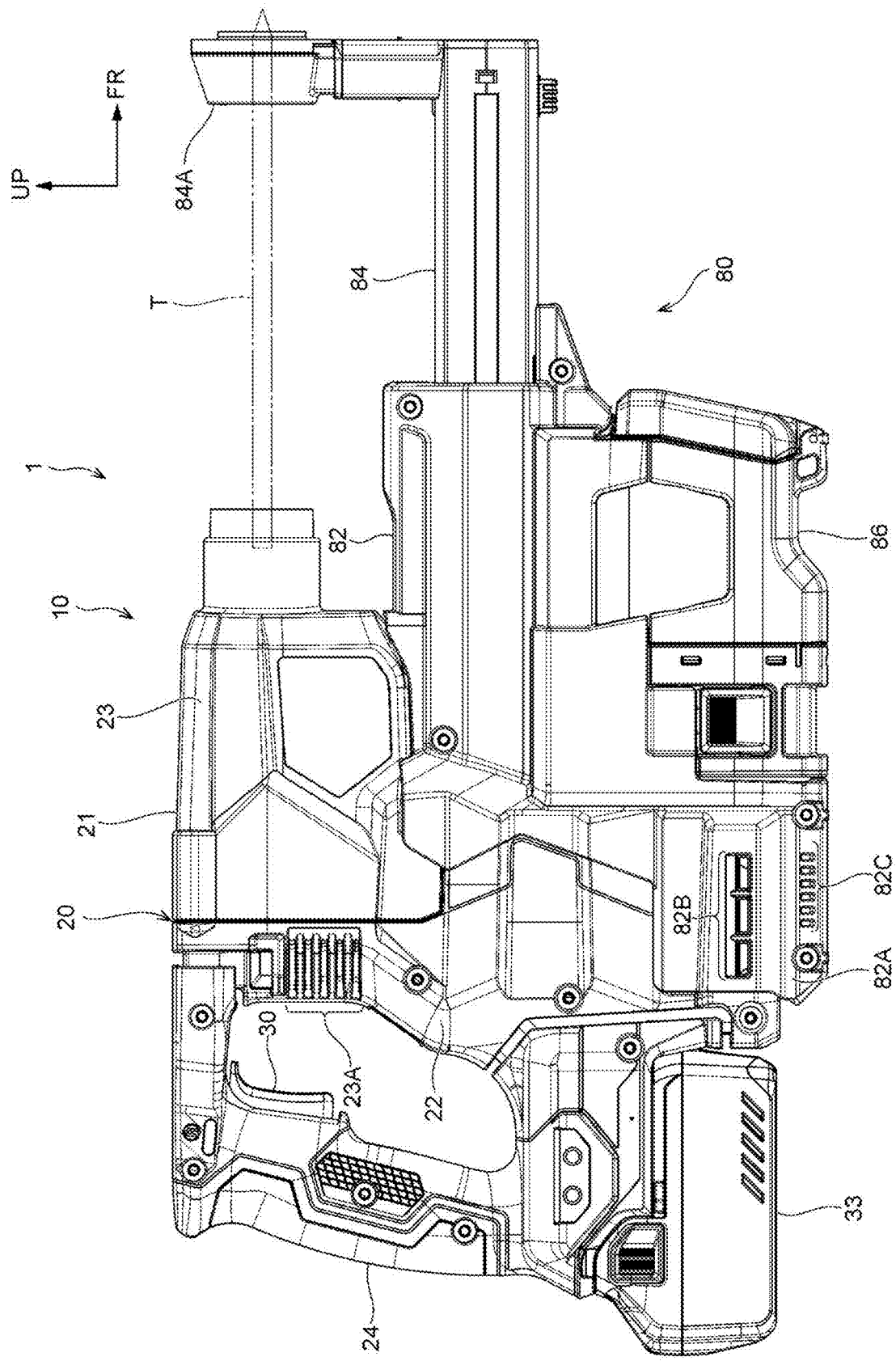
FIG. 1 is a side view showing a hammer drill according to the present embodiment as viewed from the right side.

A hammer drill 1 as a work machine according to the present embodiment will be described below with reference to the drawings. As shown in FIG. 1, the hammer drill 1 is configured to include a hammer drill body 10 and a dust collector 80. The dust collector 80 is detachably attached to the hammer drill body 10. Air around a tip tool T attached to the hammer drill body 10 may be suctioned by the dust collector 80. Arrow UP, arrow FR, and arrow RH shown as appropriate in the drawings indicate an upper side, a front side, and a right side of the hammer drill 1. In the following description, unless otherwise specified, up-down, front-rear, and left-right directions as used indicate an up-down direction, a front-rear direction, and a left-right direction of the hammer drill 1. Hereinafter, the hammer drill body 10 will be described first, and then the dust collector 80 will be described.

(Regarding Hammer Drill Body 10)

Figure 2:
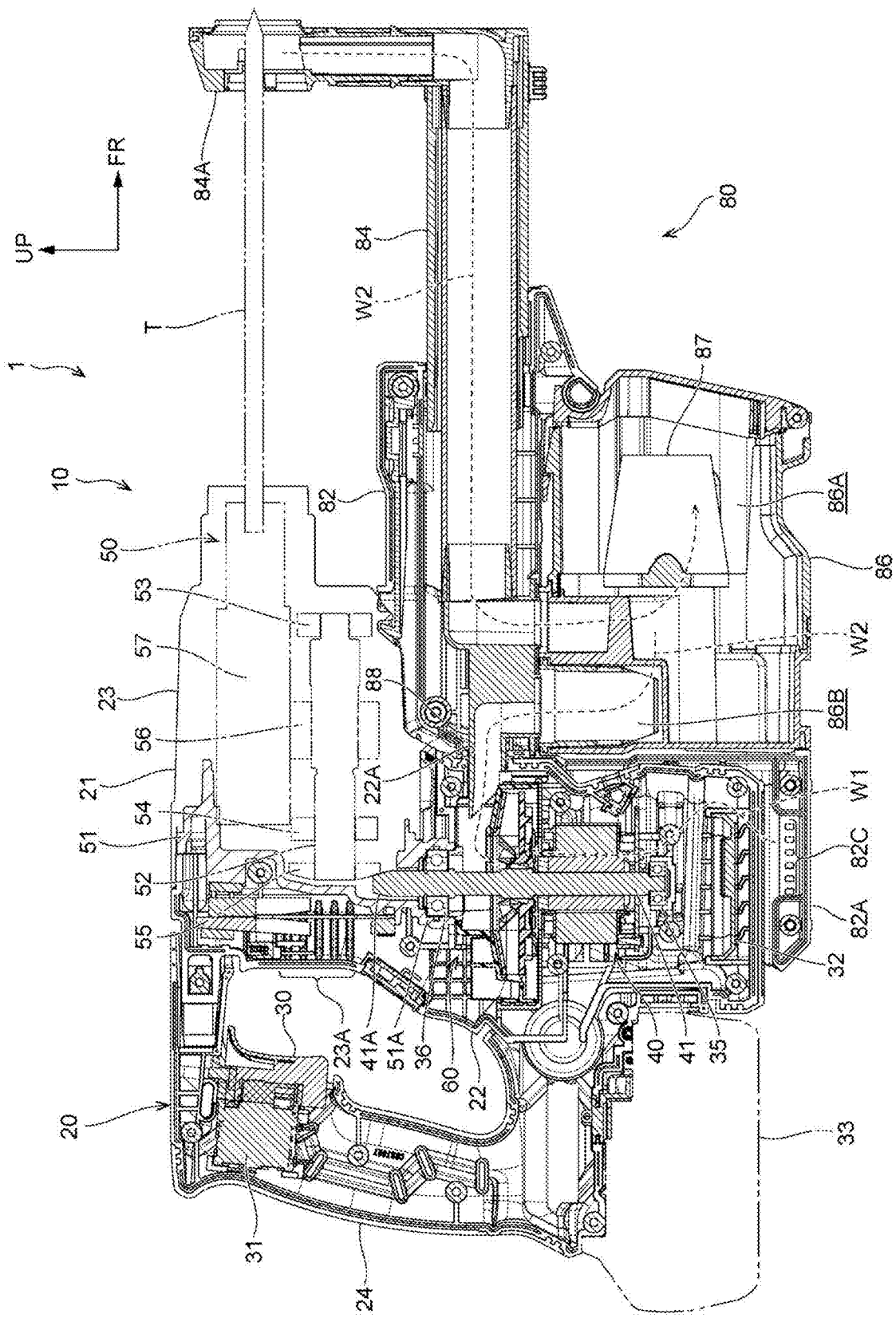
FIG. 2 is a sectional view showing the inside of the hammer drill shown in FIG. 1 as viewed from the right side.
Figure 3A:
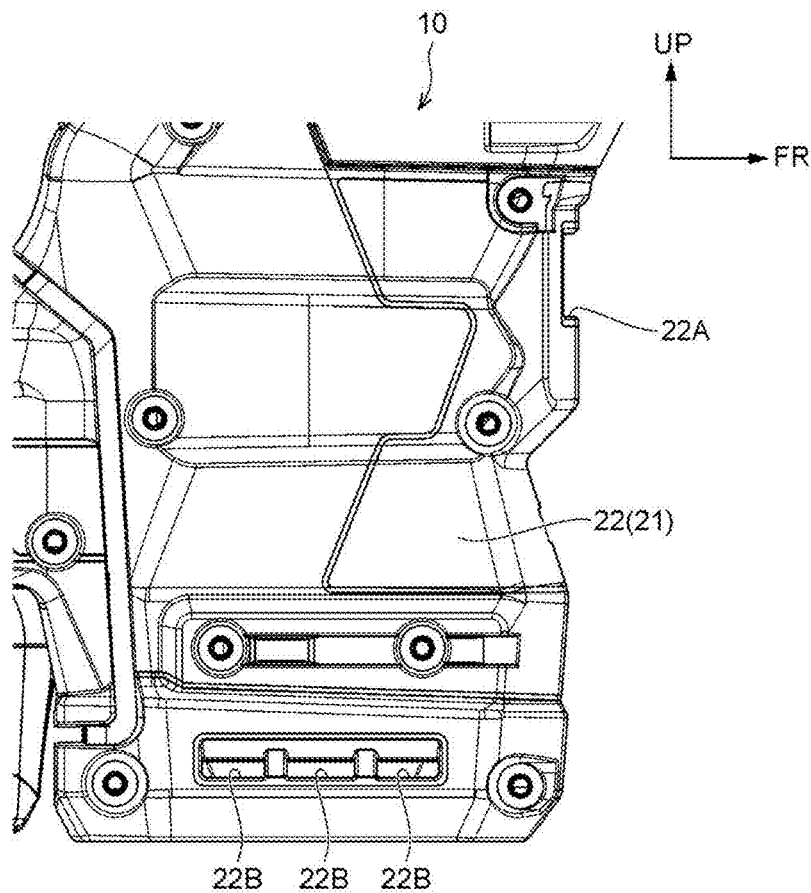
FIG. 3A and FIG. 3B are two side views showing the vicinity of a lower housing section in a hammer drill body shown in FIG. 1, as viewed from the right side and the lower side.
Figure 3B:
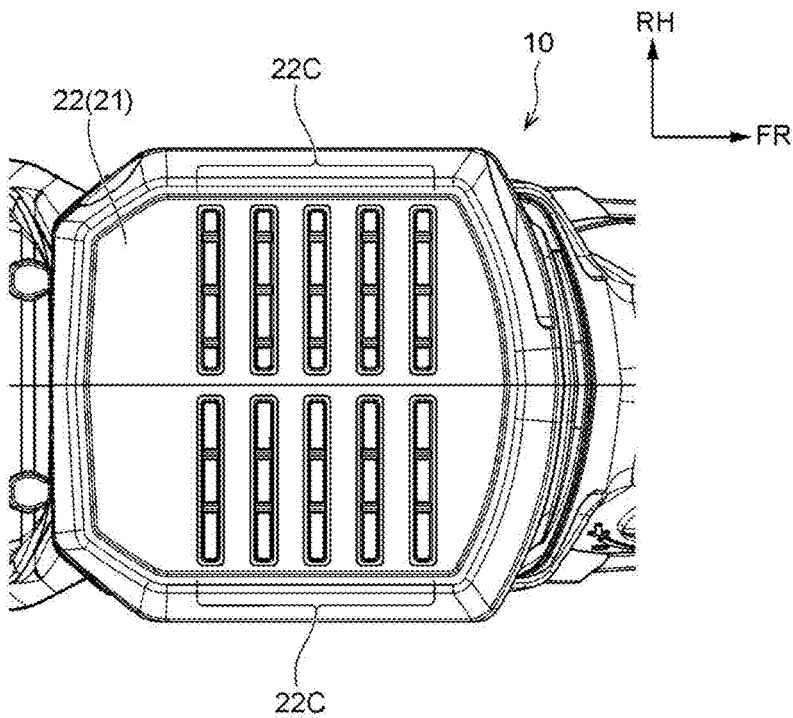

As shown in FIG. 1 and FIG. 2, the hammer drill body 1 is configured as an electric tool that performs drilling or the like on a workpiece. The hammer drill body 10 is configured to include a housing 20, a motor 40, and a transmission mechanism 50 that transmits a driving force of the motor 40 to the tip tool T. The hammer drill body 10 includes an air blowing mechanism 60. By the air blowing mechanism 60, cooling air W1 as a first airflow and dust collection air W2 as a second airflow may be generated. A configuration of the hammer drill body 10 will be described below, and a configuration of the air blowing mechanism 60 will be described after the description of the dust collector 80.

(Regarding Housing 20)

As shown in FIG. 1 to FIG. 4, the housing 20 constitutes an outer shell of the hammer drill body 10. The housing 20 is configured to include: a body housing 21, constituting a front part of the housing 20; and a handle housing 24, constituting a rear part of the housing 20. The body housing 21 is formed in a substantially inverted L shape as viewed from the right side. Specifically, the body housing 21 is configured to include: a lower housing section 22 as a first housing section, constituting a lower part of the body housing 21; and an upper housing section 23 as a second housing section, constituting an upper part of the body housing 21. A rear end of the upper housing section 23 is connected to an upper end of the lower housing section 22. The upper housing section 23 protrudes further forward than the lower housing section 22.

The handle housing 24 extends in the up-down direction. An upper end and a lower end of the handle housing 24 are bent forward and connected to a rear end of the body housing 21. A lower end of the lower housing section 22 protrudes further downward than the handle housing 24.

A dust collection port 22A is formed through a front wall at the upper end of the lower housing section 22 in the front-rear direction. A plurality of (three in the present embodiment) first air intake ports 22B (see FIG. 3A) as air intake ports are formed through left and right sidewalls at the lower end of the lower housing section 22. The first air intake port 22B is formed in a substantially elongated hole shape with the front-rear direction as a longitudinal direction, and the first air intake ports 22B are arranged side by side in the front-rear direction. A plurality of (ten in the present embodiment) second air intake ports 22C (see FIG. 3B) as air intake ports are formed through a lower wall of the lower housing section 22. The second air intake port 22C is formed in a substantially elongated hole shape with the left-right direction as the longitudinal direction. The second air intake ports 22C are arranged in such a way that two rows of second air intake ports 22C are arranged side by side in the left-right direction, each row having five second air intake ports 22C arranged side by side in the front-rear direction. A plurality of (five in the present embodiment)

exhaust ports 23A are formed through left and right sidewalls at the rear end of the upper housing section 23. The exhaust port 23A is formed in a substantially elongated hole shape with the front-rear direction as the longitudinal direction, and the exhaust ports 23A are arranged side by side in the up-down direction.

A trigger 30 is provided at the upper end of the handle housing 24. The trigger 30 protrudes forward from the handle housing 24 and is configured to allow a rearward pulling operation. In the handle housing 24, a switch mechanism 31 is provided on the rear side of the trigger 30. The switch mechanism 31 includes a switch (not shown) operated by the trigger 30. The switch is electrically connected to a controller 32 provided at the lower end of the lower housing section 22, and outputs an output signal corresponding to an operation state of the trigger 30 to the controller 32. The controller 32 is arranged between the first air intake ports 22B on the left and right and is arranged on the upper side of the second air intake port 22C. A battery pack 33 is attached to the lower end of the handle housing 24. Electric power is supplied from the battery pack 33 to the motor 40 (described later) and the controller 32.

(Regarding Motor 40)

Figure 4:
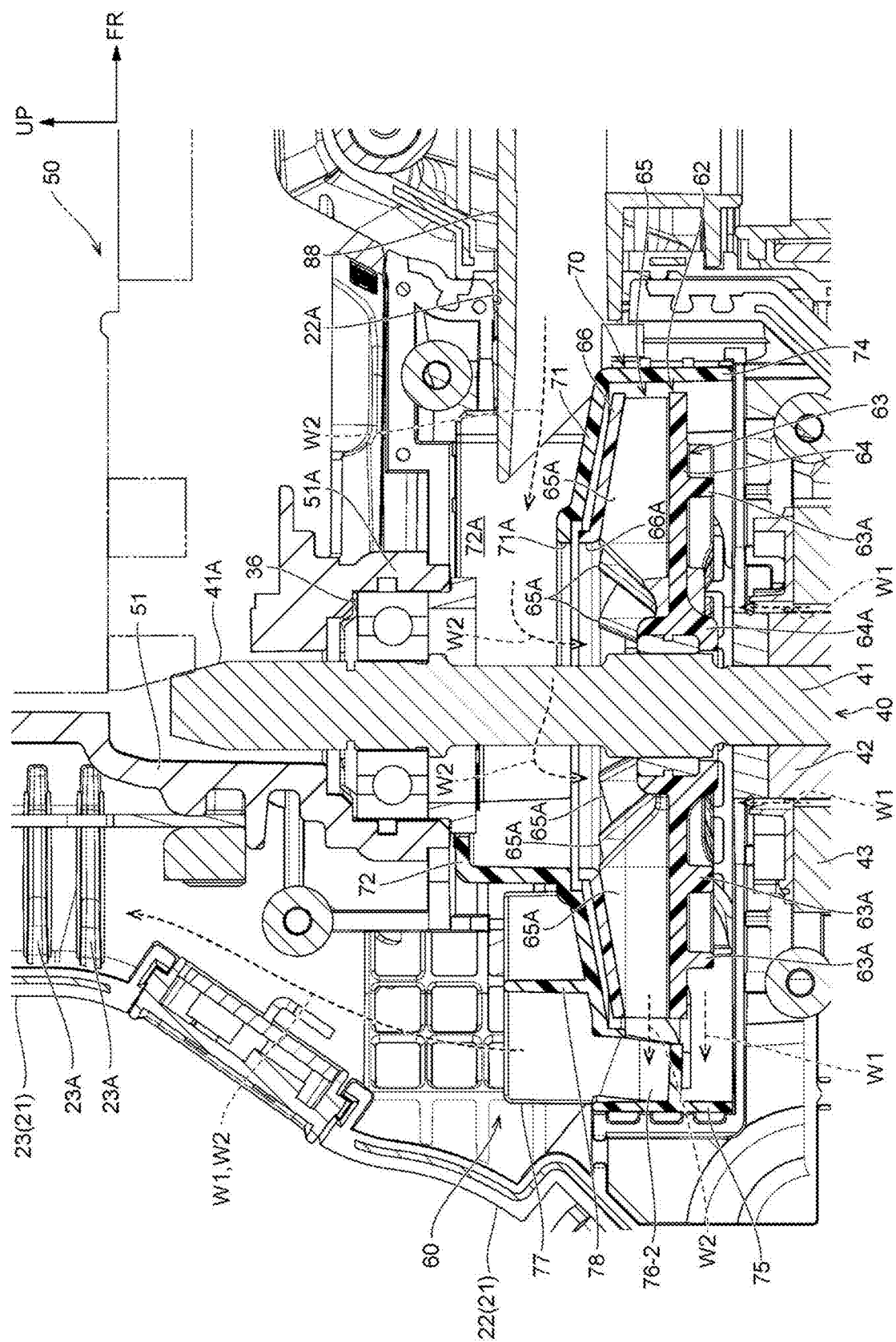
FIG. 4 is an enlarged sectional view showing the vicinity of an air blowing mechanism shown in FIG. 2.
Figure 5A:
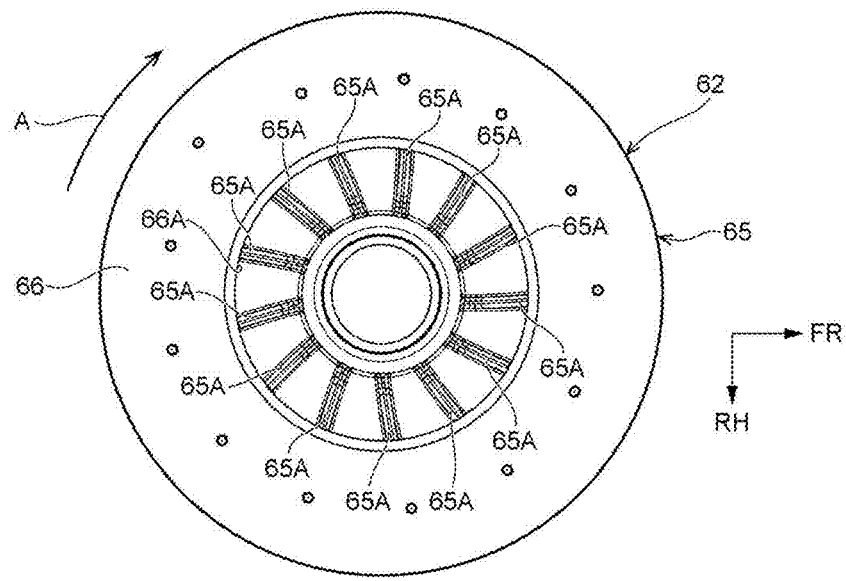
FIG. 5A to FIG. 5C are three side views of a fan shown in FIG. 4, as viewed from the upper side, the right side, and the lower side.
Figure 5B:
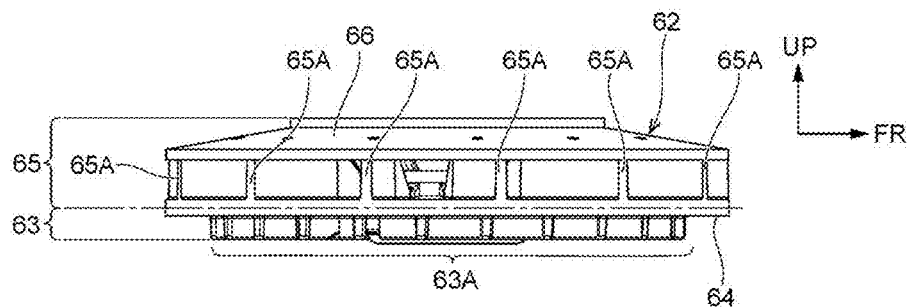
Figure 5C:
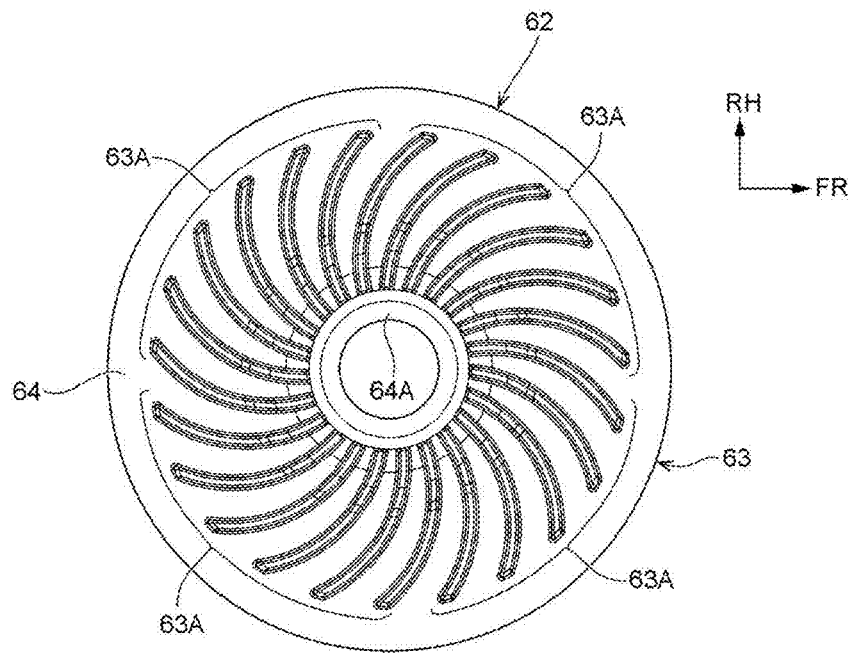
Figure 6:
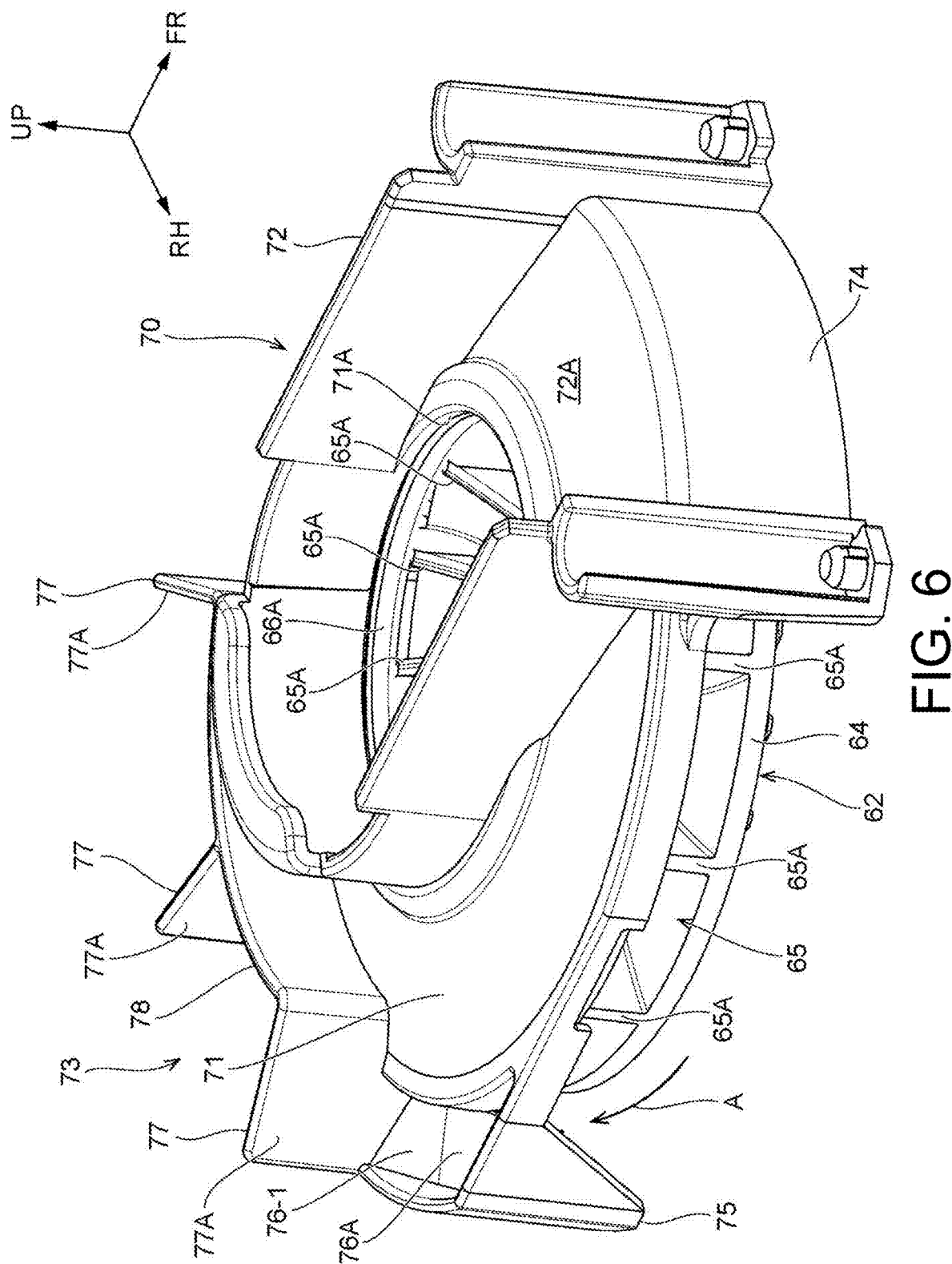
FIG. 6 is a perspective view of the air blowing mechanism shown in FIG. 4 as viewed obliquely from the front right side.

As shown in FIG. 2 and FIG. 4, the motor 40 is configured as a three-phase brushless motor, and is accommodated in the lower housing section 22 in the body housing 21. Specifically, the motor 40 is arranged on the upper side of the controller 32 and is electrically connected to the controller 32. The motor 40 includes an output shaft 41 with the up-down direction as an axial direction. A lower end of the output shaft 41 is rotatably supported by a motor bearing 35 fixed to the lower housing section 22. An upper end portion of the output shaft 41 is rotatably supported by a motor bearing 36 held by a bearing holder 51A of an inner housing 51 (described later). A rotor 42 of a substantially cylindrical shape is provided radially outside a lower part of the output shaft 41. A stator 43 is provided radially outside the rotor 42. A pinion gear 41A is formed at the upper end of the output shaft 41.

(Regarding Transmission Mechanism 50)

As shown in FIG. 2, the transmission mechanism 50 is configured as a mechanism part that transmits rotational force of the motor 40 to the tip tool T and drives the tip tool T. The transmission mechanism 50 is configured to include the inner housing 51, an intermediate shaft 52, and a transmission section 57, is accommodated in the upper housing section 23 in the body housing 21, and is arranged on the front side of the exhaust port 23A.

The inner housing 51 is formed in a substantially bottomed elliptical shape open forward. The inner housing 51 is arranged on the upper side of the motor 40 so as to partition the rear end of the upper housing section 23 in the front-rear direction. Specifically, the inner housing 51 is arranged in close proximity to the front side of the exhaust port 23A. The bearing holder 51A is formed at a lower end of the inner housing 51. The bearing holder 51A is formed in a substantially stepped cylindrical shape open downward. The upper end of the output shaft 41 of the motor 40 is inserted into the bearing holder 51A, and the motor bearing 36 is held by the bearing holder 51A.

The intermediate shaft 52 is formed in a substantially columnar shape with the front-rear direction as the axial direction. A front end and a rear end of the intermediate shaft 52 are rotatably supported by a bearing 53 and a bearing 54 fixed to the body housing 21. A bevel gear 55 is provided in an integrally rotatable manner at the rear end of the intermediate shaft 52. The bevel gear 55 is meshed with the pinion gear 41A of the output shaft 41. Accordingly, as the motor 40 is driven and the output shaft 41 rotates, the intermediate shaft 52 is configured to rotate about its own axis. The intermediate shaft 52 is provided with a motion conversion member 56. The motion conversion member 56 is configured to convert a rotational motion of the intermediate shaft 52 into a reciprocating motion in the front-rear direction and transmit it to the transmission section 57 (described later).

The transmission section 57 extends in the front-rear direction on the upper side of the intermediate shaft 52. The tip tool T is attached to a front end of the transmission section 57. The tip tool T is formed in a substantially columnar shape with the front-rear direction as the axial direction. A rear end of the tip tool T is attached to the transmission section 57. The transmission section 57 is connected to the intermediate shaft 52. Accordingly, the rotational force of the motor 40 is transmitted to the tip tool T. The tip tool T rotates about its own axis and performs drilling on the workpiece.

When transmitting the rotational force of the motor 40 to the tip tool T and driving the tip tool T, the transmission mechanism 50 generates heat due to friction. The transmission mechanism 50 is an example of a heat generation section.

(Regarding Dust Collector 80)

As shown in FIG. 1 and FIG. 2, the dust collector 80 as a whole is formed in a substantially rectangular box shape. The dust collector 80 is arranged on the front side of the lower housing section 22 in the hammer drill body 10 and is assembled to the body housing 21. The dust collector 80 is configured to include a cover 82, a suction section 84, and a dust collection section 86.

(Regarding Cover 82)

The cover 82 constitutes an outer shell of an upper part and a rear end of the dust collector 80. The cover 82 is composed of cover members split into two in the left-right direction. By assembling the split cover members to each other, the cover 82 is formed. A rear end 82A of the cover 82 protrudes further rearward than the dust collection section 86 (described later), and is arranged so as to cover the lower end of the lower housing section 22 in the hammer drill body 10 from both sides in the left-right direction and from the lower side. A first opening 82B for taking in air from the first air intake port 22B of the hammer drill body 10 is formed through the rear end 82A of the cover 82. The first opening 82B is arranged outside in the left-right direction of the first air intake port 22B. A second opening 82C for taking in air from the second air intake port 22C of the hammer drill body 10 is formed through the rear end 82A of the cover 82. The second opening 82C is arranged on the lower side of the first opening 82B.

(Regarding Suction Section 84)

The suction section 84 constitutes the upper part of the dust collector 80. The suction section 84 is formed in a substantially cylindrical shape extending in the front-rear direction, and is assembled to the cover 82. A front end of the suction section 84 is bent upward. A tip of the suction section 84 is provided with a suction nozzle 84A. The suction nozzle 84A is formed in a substantially cylindrical shape with the front-rear direction as the axial direction. The suction nozzle 84A is arranged coaxially with the tip tool T, and a tip of the tip tool T is inserted into the suction nozzle 84A. The inside of the suction nozzle 84A and the inside of the suction section 84 communicate with each other. By the dust collection air W2 generated by a dust collection fan 65

(described later), air around the tip of the tip tool T is suctioned into the suction section 84.
(Regarding Dust Collection Section 86)

The dust collection section 86 is formed in a substantially rectangular parallelepiped box shape, is arranged on the lower side of the suction section 84, and is assembled to the cover 82. The dust collection section 86 includes a cyclone chamber 86A and a filter chamber 86B.

The cyclone room 86A communicates with a rear end of the suction section 84. The dust collection air W2 suctioned to the suction section 84 flows into the cyclone chamber 86A. A cyclone section 87 is provided within the cyclone chamber 86A. The cyclone section 87 is formed in a substantially cylindrical shape with the front-rear direction as the axial direction. By the cyclone section 87, the dust collection air W2 flowing into the cyclone chamber 86A whirls around so that air and dust within the dust collection air W2 may be separated.

The filter chamber 86B is arranged on the rear side of the cyclone section 87. The dust collection air W2 from which dust has been separated by the cyclone section 87 is configured to flow into the filter chamber 86B. The filter chamber 86B is provided with a filter (not shown). The dust collection air W2 flowing into the filter chamber 86B may pass through the filter and flow upward. A discharge section 88 is provided on the upper side of the filter chamber 86B. The discharge section 88 is formed in a substantially cylindrical shape extending in the front-rear direction. A front end of the discharge section 88 is bent downward and is open toward the cyclone chamber 86A side. Accordingly, the discharge section 88 and the cyclone chamber 86A communicate with each other. A rear end of the discharge section 88 is inserted from the front side into the dust collection port 22A of the hammer drill body 10. Accordingly, the dust collection air W2 that has passed through the filter chamber 86B is configured to flow into the housing 20 from the dust collection port 22A.
(Regarding Air Blowing Mechanism 60)
Next, the air blowing mechanism 60 of the hammer drill body 10 is described. As shown in FIG. 2 and FIG. 4 to FIG. 8B, the air blowing mechanism 60 is configured to include a fan 62, and a fan guide 70 as a rectification member.
(Regarding Fan 62)

The fan 62 is fixed in an integrally rotatable manner to an upper part of the output shaft 41 of the motor 40, and is arranged on the upper side of the rotor 42 and the stator 43 of the motor 40. The fan 62 as a whole is formed in a disk shape with the up-down direction as a thickness direction. The fan 62 is configured to include: a cooling fan 63 as a first fan, constituting a lower part of the fan 62; and the dust collection fan 65 as a second fan, constituting an upper part of the fan 62. The cooling fan 63 and the dust collection fan 65 are configured as centrifugal fans.

The cooling fan 63 is configured to include a base plate 64 and a plurality of cooling air blades 63A. The base plate 64 as a whole is formed in a substantially disk shape with the up-down direction as a plate thickness direction. A fan fixing section 64A is formed in a central part of the base plate 64. The fan fixing section 64A is formed in a substantially cylindrical shape with the up-down direction as the axial direction, and protrudes from the base plate 64 toward both sides in the up-down direction. The output shaft 41 is fitted into the fan fixing section 64A, and the fan fixing section 64A is fixed in an integrally rotatable manner to the output shaft 41.

The cooling air blade 63A is formed on a lower surface of the base plate 64, and extends in a substantially arc shape along a radial direction of the base plate 64 as viewed from the lower side. The plurality of cooling air blades 63A are arranged at predetermined angles in a circumferential direction of the base plate 64. When the fan 62 rotates together with the output shaft 41 toward one side in a rotation direction (in the direction of arrow A in FIG. 5A to FIG. 7A), the cooling air W1 may be generated to be blown radially outward of the fan 62 from a tip of the cooling air blade 63A (see FIG. 4 and FIG. 7B). Specifically, the cooling air W1 is generated that flows into the body housing 21 from the first air intake port 22B and the second air intake port 22C of the body housing 21. The cooling air W1 may pass upward through a side of the controller 32, pass upward between the rotor 42 and the stator 43 of the motor 40, and flow into the cooling fan 63 from the lower side (see FIG. 2).

The dust collection fan 65 is configured to include the base plate 64, a plurality of dust collection air blades 65A, and a fan cover 66. That is, the base plate 64 is configured as a part common to the cooling fan 63 and the dust collection fan 65. The dust collection air blade 65A is formed on an upper surface of the base plate 64, and extends in a substantially arc shape along the radial direction of the base plate 64 as viewed from the upper side. The plurality of dust collection air blades 65A are arranged at predetermined angles in the circumferential direction of the base plate 64. A height in the up-down direction of the dust collection air blade 65A is set greater than a height in the up-down direction of the cooling air blade 63A.

The fan cover 66 is formed in a substantially annular plate shape with the up-down direction as the plate thickness direction, and is connected to an upper end of the dust collection air blade 65A. The fan cover 66 is slightly inclined upward as going radially inward in side view. A central opening of the fan cover 66 is configured as a fan side suction port 66A. The output shaft 41 is inserted through a central part of the fan side suction port 66A. Furthermore, the dust collection port 22A (rear end of the discharge section 88 of the dust collector 80) of the housing 20 is arranged on an obliquely upper front side of the dust collection fan 65.

Figure 7A:
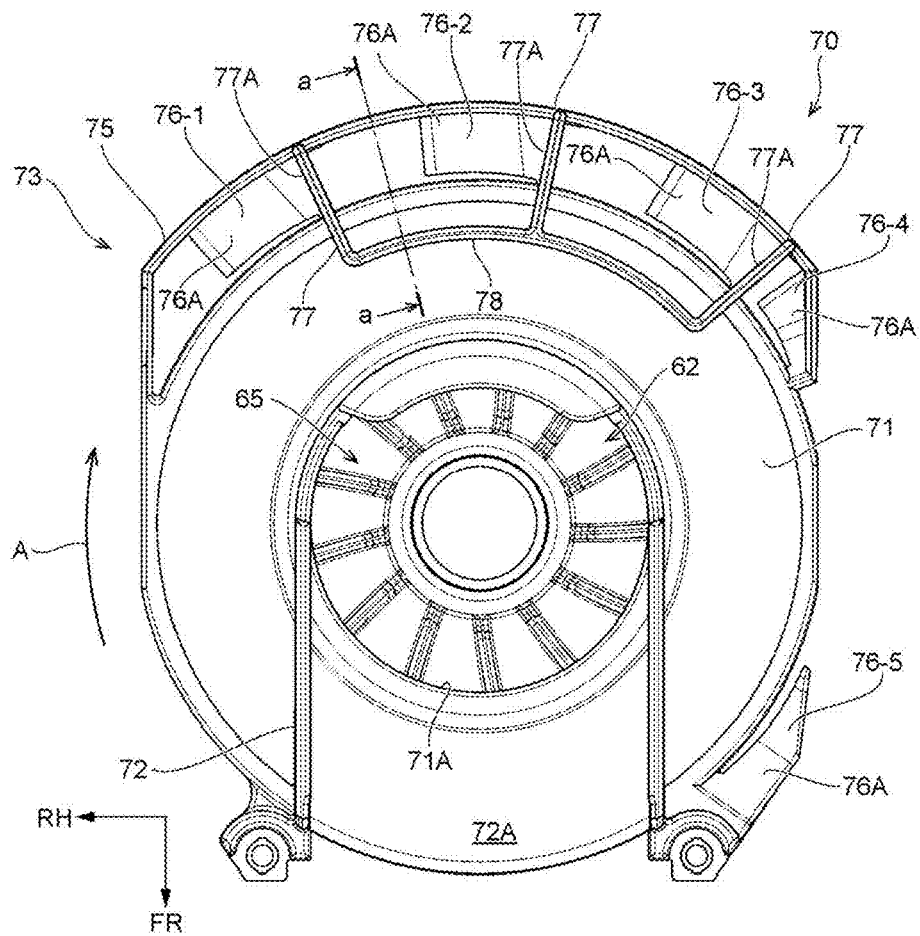
FIG. 7A is a plan view of the air blowing mechanism shown in FIG. 6 as viewed from the upper side.
Figure 7B:
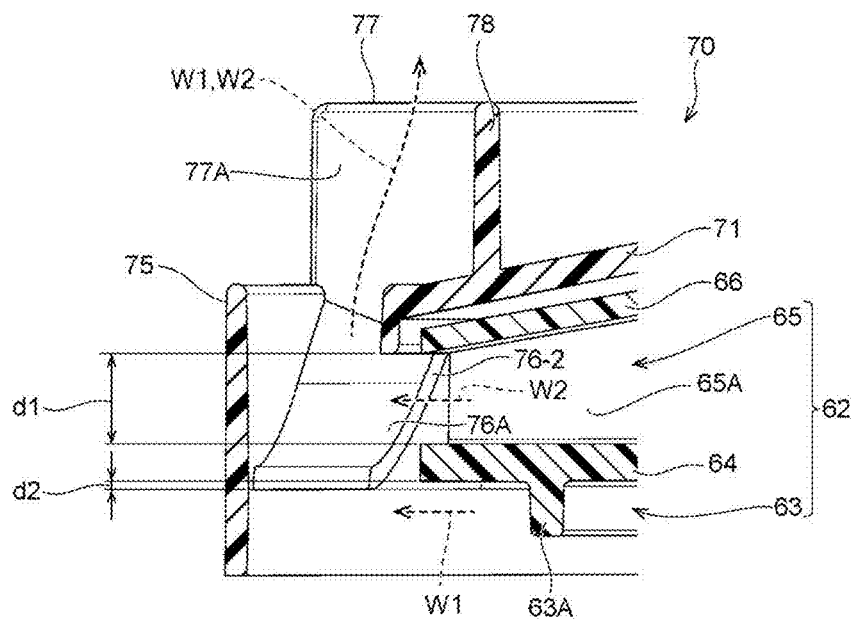
FIG. 7B is a sectional view along line a-a in FIG. 7A.
Figure 8A:
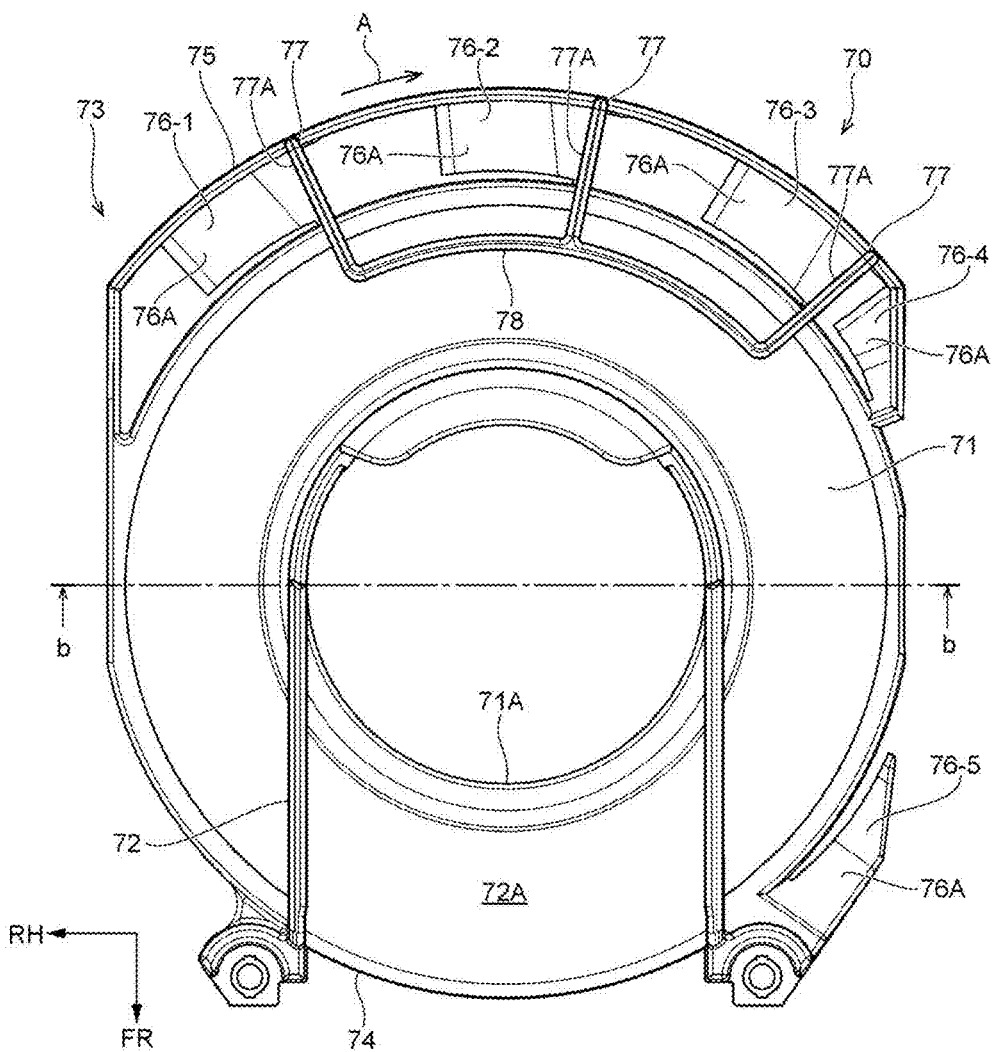
FIG. 8A is a plan view of a fan guide in the air blowing mechanism shown in FIG. 7A and FIG. 7B.
Figure 8B:
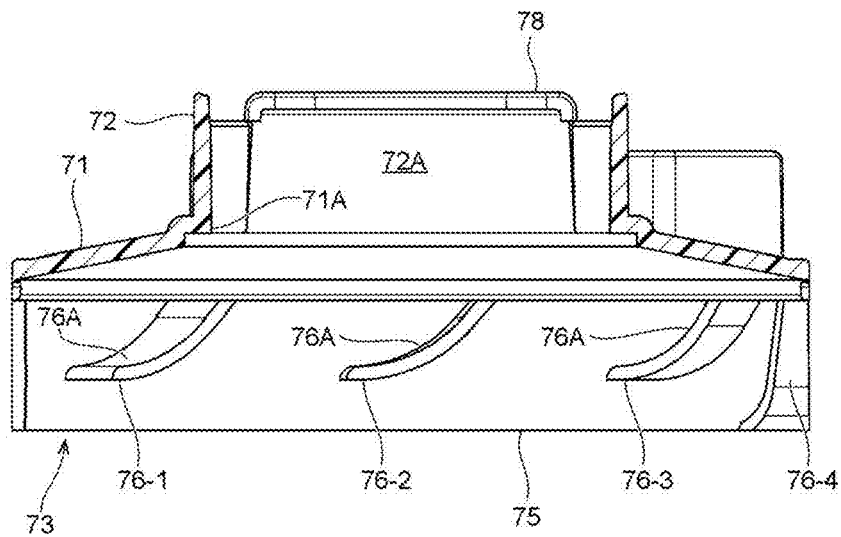
FIG. 8B is a sectional view along line b-b in FIG. 8A.

When the fan 62 rotates together with the output shaft 41 toward one side in the rotation direction, the dust collection air W2 may be generated to be blown radially outward of the fan 62 by the dust collection air blade 65A (see FIG. 4 and FIG. 7B). Specifically, the dust collection air W2 is generated that flows into the body housing 21 from the dust collection port 22A of the body housing 21. The dust collection air W2 may flow into the dust collection fan 65 from the fan side suction port 66A of the dust collection fan 65. In the fan 62, an air volume of the cooling air W1 blown out from the cooling fan 63 is set larger than an air volume of the dust collection air W2 blown out from the dust collection fan 65.
(Regarding Fan Guide 70)

The fan guide 70 as a whole is formed in a substantially bottomed cylindrical shape open downward. The fan guide 70 is assembled to the body housing 21 of the housing 20, and the fan 62 is accommodated inside the fan guide 70. The fan guide 70 is configured to include a guide base 71, a partition wall 72, and a rectification mechanism part 73.
(Regarding Guide Base 71)

The guide base 71 is formed in a substantially annular plate shape with the up-down direction as the plate thickness direction, and is slightly inclined upward as going radially inward in side view. A central opening of the fan guide 70 is configured as a guide side suction port 71A. An inner diameter of the guide side suction port 71A substantially matches an inner diameter of the fan side suction port 66A of the fan 62. The guide base 71 is arranged on the upper side of the fan 62 and coaxially with the fan 62. The output shaft 41 is inserted into the guide side suction port 71A. An outer diameter of the guide base 71 is set larger than an outer diameter of the fan 62. The fan 62 is covered by the guide base 71 from the upper side.

(Regarding Partition Wall 72)

The partition wall 72 is formed in a substantially U-shaped plate shape open forward in plan view, and protrudes upward from an upper surface of the guide base 71. Specifically, a rear end of the partition wall 72 protrudes upward from an edge of the guide side suction port 71A. Accordingly, space on the upper side of the guide base 71 (fan 62) is partitioned by the partition wall 72. The space surrounded by the partition wall 72 and open forward is configured as a dust collection air passage 72A serving as a second airflow passage. The rear end of the discharge section 88 of the dust collector 80 protrudes rearward from the dust collection port 22A and is arranged at a front end of the dust collection air passage 72A. That is, the dust collection air passage 72A communicates with the dust collection port 22A. Accordingly, the dust collection air W2 flowing into the dust collection air passage 72A from the discharge section 88 is configured to pass through the dust collection air passage 72A, and flow into the dust collection fan 65 from the guide side suction port 71A and the fan side suction port 66A.

(Regarding Rectification Mechanism Part 73)

The rectification mechanism part 73 is configured to include: a front-rear pair of guide walls 74 and 75; and a plurality of (five in the present embodiment) rectification elements 76-1, 76-2, 76-3, 76-4, and 76-5 as rectification sections.

The guide walls 74 and 75 are formed in a substantially elongated plate shape with the radial direction of the fan 26 as the plate thickness direction and extending in the circumferential direction of the fan 62. That is, the guide walls 74 and 75 are curved in a substantially arc shape in plan view. The guide walls 74 and 75 are arranged radially outside the fan 62 and connected to the guide base 71. Specifically, the guide wall 74 on the front side extends downward from a front end of the guide base 71. The guide wall 75 on the rear side is arranged at a position offset to the rear side of the guide base 71 in plan view. Upper ends of both longitudinal ends of the guide wall 75 extend forward and are connected to an outer periphery of the guide base 71. Lower ends of the guide walls 74 and 75 are arranged on the lower side of a lower end of the fan 62.

Among the rectification elements 76-1 to 76-5, three rectification elements 76-1 to 76-3 are configured in the same manner, and two rectification elements 76-4 and 76-5 are configured in the same manner as the rectification elements 76-1 to 76-3 except for the points shown below. Hereinafter, the rectification elements 76-1 to 76-3 will be described first, and then the rectification elements 76-4 and 76-5 will be described.

The rectification elements 76-1 to 76-3 are integrally formed with the guide wall 75 on the rear side, extend radially inward of the fan 62 from an inner peripheral surface of the guide wall 75, and are arranged at predetermined intervals in the circumferential direction of the fan 62. The rectification elements 76-1 to 76-3 are formed in a rib shape extending along a direction that is inclined upward as going toward one side in a rotation direction of the fan 62 as viewed from radially inside the fan 62 (output shaft 41). Specifically, the rectification elements 76-1 to 76-3 are curved in a substantially arc shape so that a longitudinal intermediate part of the rectification elements 76-1 to 76-3 is convex toward one side in the rotation direction of the fan 62 and downward. The other side surface of the rectification elements 76-1 to 76-3 in the rotation direction of the fan 62 is configured as a rectification surface 76A. The rectification elements 76-1 to 76-3 overlap the cooling air blade 63A of the cooling fan 63 and the dust collection air blade 65A of the dust collection fan 65 as viewed in the radial direction of the fan 62. Specifically, a lap distance d1 in the up-down direction between the rectification elements 76-1 to 76-3 and the dust collection air blade 65A is set larger than a lap distance d2 in the up-down direction between the rectification elements 76-1 to 76-3 and the cooling air blade 63A (see FIG. 7B).

A rectification extension section 77 is integrally formed at upper ends of the rectification elements 76-1 to 76-3. The rectification extension section 77 is formed in a substantially rectangular plate shape with the rotation direction of the fan 26 as the plate thickness direction, and extends upward from the upper ends of the rectification elements 76-1 to 76-3. The rectification extension section 77 protrudes upward from the guide base 71. An inner end of the rectification extension section 77 in the radial direction of the fan 62 extends upward from the guide base 71. Furthermore, three rectification extension sections 77 are connected by a connecting wall 78 provided on the guide base 71. The connecting wall 78 extends along the circumferential direction of the guide base 71 in plan view. The other side surface of the rectification extension section 77 in the rotation direction of the fan 62 is configured as an extension surface 77A. The extension surface 77A is arranged along a plane orthogonal to the rotation direction of the fan 62. A lower end of the extension surface 77A is connected to an upper end of the rectification surface 76A of the rectification elements 76-1 to 76-3.

The rectification element 76-4 is integrally formed with the guide wall 75 on the rear side, extends radially inward of the fan 62 from the inner peripheral surface of the guide wall 75, and is arranged on one side in the rotation direction of the fan 62 with respect to the rectification element 76-3. The rectification element 76-5 is arranged on one side in the rotation direction of the fan 62 with respect to the rectification element 76-4, is arranged adjacent to the guide wall 74 on the front side on the other side in the rotation direction of the fan 62, and is connected to the guide wall 74. The rectification extension section 77 of the rectification elements 76-1 to 76-3 is not provided in the rectification elements 76-4 and 76-5. Lower ends of the rectification elements 76-4 and 76-5 are arranged on the lower side of lower ends of the rectification elements 76-1 to 76-3.

The exhaust port 23A of the housing 20 is arranged substantially directly above the rectification elements 76-1 to 76-4 in side view. The cooling air W1 and the dust collection air W2 blown radially outward from the fan 62 may be rectified by the rectification surface 76A of the rectification elements 76-1 to 76-5, flow upward from the fan guide 70, and be exhausted to the outside of the housing 20 from the exhaust port 23A (see FIG. 4). The dust collection air passage 72A partitioned by the partition wall 72 is arranged at a position not overlapping the rectification elements 76-1 to 76-5 in plan view.

(Effects)

During drilling with the hammer drill 1 configured as above, since an operator performs a pulling operation on the trigger 30 of the hammer drill body 10, the motor 40 is driven, and the tip tool T rotates about its own axis. Accordingly, drilling can be performed on the workpiece.

During driving of the motor 40, the fan 62 rotates together with the output shaft 41 of the motor 40. Accordingly, the cooling air W1 is generated by the cooling fan 63 of the fan 62, and the dust collection air W2 is generated by the dust collection fan 65 of the fan 62.

Specifically, the air on the lower side of the cooling fan 63 is drawn into the cooling fan 63 side and blown radially outward of the cooling fan 63. Accordingly, the cooling air W1 is generated that flows into the body housing 21 from the first air intake port 22B and the second air intake port 22C of the housing 20. The cooling air W1 flowing into the body housing 21 passes upward through a side part of the controller 32, and passes upward between the rotor 42 and the stator 43 of the motor 40 (see FIG. 2). Accordingly, the controller 32 and the motor 40 are cooled by the cooling air W1.

The cooling air W1 that has cooled the motor 40 flows into the cooling fan 63, and is blown radially outward of the fan 62 and toward one side in the rotation direction of the fan 62 from the cooling air blade 63A. The cooling air W1 blown out from the cooling air blade 63A contacts the guide wall 75 of the fan guide 70, and flows along the inner peripheral surface of the guide wall 75 toward one side in the rotation direction of the fan 62. At this time, the cooling air W1 contacts the rectification surface 76A at the lower ends of the rectification elements 76-1 to 76-4, and flows along the rectification surface 76A toward one side in the rotation direction of the fan 62. Similarly, the cooling air W1 blown out from the cooling air blade 63A contacts the rectification surface 76A at the lower end of the rectification element 76-5, and flows along the rectification surface 76A toward one side in the rotation direction of the fan 62. Accordingly, a direction of the cooling air W1 is changed into upward (toward one side in the axial direction of the output shaft 41) by the rectification surface 76A, and the cooling air W1 is blown upward from the rectification elements 76-1 to 76-5. In the rectification elements 76-1 to 76-3, since the rectification extension section 77 extends upward of the rectification elements 76-1 to 76-3, the cooling air W1 flows upward along the rectification extension section 77 and is blown upward from the rectification extension section 77 (see FIG. 4 and FIG. 7B).

On the other hand, by rotation of the dust collection fan 65, the air inside the dust collection air passage 72A flows into the dust collection fan 65 from the guide side suction port 71A of the fan guide 70 and the fan side suction port 66A of the dust collection fan 65, and is blown radially outward of the dust collection fan 65. Accordingly, in the dust collector 80 communicating with the dust collection air passage 72A, the dust collection air W2 is generated that flows from the suction nozzle 84A to the discharge section 88. Specifically, the dust collection air W2 flows into the suction section 84 from the suction nozzle 84A. The dust collection air W2 flowing into the suction section 84 passes through the cyclone chamber 86A and the filter chamber 86B of the dust collection section 86. Accordingly, dust contained in the dust collection air W2 is collected within the cyclone chamber 86A, and the dust collection air W2 from which the dust has been separated is exhausted from the discharge section 88 of the dust collector 80 to the hammer drill body 10 side (see FIG. 2).

The dust collection air W2 exhausted from the discharge section 88 of the dust collector 80 to the hammer drill body 10 passes through the dust collection air passage 72A of the fan guide 70, and flows into the dust collection fan 65 from the guide side suction port 71A of the fan guide 70 and the fan side suction port 66A of the dust collection fan 65. The dust collection air W2 is blown radially outward of the fan 62 and toward one side in the rotation direction of the fan 62 from the dust collection air blade 65A of the dust collection fan 65.

The dust collection air W2 blown out from the dust collection fan 65 contacts the guide wall 75 of the fan guide 70, and flows along the inner peripheral surface of the guide wall 75 toward one side in the rotation direction of the fan 62. At this time, the dust collection air W2 is drawn into the cooling air W1 and joins the cooling air W1. That is, the dust collection air W2 contacts the rectification surface 76A at the lower ends of the rectification elements 76-1 to 76-5, and flows along the rectification surface 76A toward one side in the rotation direction of the fan 62. Accordingly, a direction of the dust collection air W2 is changed into upward (toward one side in the axial direction of the output shaft 41) by the rectification surface 76A, and the dust collection air W2 is blown upward from the rectification elements 76-1 to 76-5. In other words, by the rectification surface 76A of the rectification elements 76-1 to 76-5, the dust collection air W2 is prevented from flowing downward (toward the other side in the axial direction of the output shaft 41). In the rectification elements 76-1 to 76-3, the dust collection air W2 flows upward along the rectification extension section 77 and is blown upward from the rectification extension section 77, together with the cooling air W1 (see FIG. 4 and FIG. 7B).

The cooling air W1 and the dust collection air W2 blown upward from the rectification extension section 77 and the rectification elements 76-4 and 76-5 flow upward through the space between the inner housing 51 of the transmission mechanism 50 and a rear wall of the body housing 21, and are exhausted to the outside of the housing 20 from the exhaust port 23A. Accordingly, the transmission mechanism 50 is cooled by the cooling air W1 and the dust collection air W2 flowing out from the fan guide 70.

As described above, in the hammer drill body 10, the dust collection port 22A, the first air intake port 22B, and the second air intake port 22C are formed in the lower housing section 22 that accommodates the motor 40, and the exhaust port 23A is formed in the upper housing section 23 that accommodates the transmission mechanism 50. The fan 62 including the cooling fan 63 and the dust collection fan 65 is provided within the lower housing section 22. By rotation of the cooling fan 63, the cooling air W1 is generated that flows from the first air intake port 22B and the second air intake port 22C to the cooling fan 63 side. By rotation of the dust collection fan 65, the dust collection air W2 is generated that flows from the dust collection port 22A to the dust collection fan 65 side. Here, the fan guide 70 is provided within the lower housing section 22. The fan guide 70 includes the rectification elements 76-1 to 76-5. The rectification elements 76-1 to 76-5 rectify the cooling air W1 blown out from the cooling fan 63 and the dust collection air W2 blown out from the dust collection fan 65, and cause the cooling air W1 and the dust collection air W2 to flow to the exhaust port 23A. Accordingly, the cooling air W1 and the dust collection air W2 after reaching the fan 62 can be rectified by the rectification elements 76-1 to 76-5 and are able to flow to the upper housing section 23 side without being directly exhausted to the outside of the housing 20. As a result, by utilizing the dust collection air W2 for collecting dust around the tip of the tip tool T and the cooling air W1 for cooling the controller 32 and the motor 40, the transmission mechanism 50 arranged in the upper housing section 23 can be cooled. In other words, the transmission mechanism 50 can be cooled by utilizing the cooling air W1 and the dust collection air W2 that have reached the fan 62. Accordingly, the transmission mechanism 50 can be efficiently cooled, and the cooling performance of the hammer drill 1 can be improved.

The cooling fan 63 and the dust collection fan 65 are centrifugal fans, are fixed to the output shaft 41 of the motor 40 and are arranged side by side in the axial direction of the output shaft 41. Accordingly, by drawing the air into the fan 62 from the space on both sides of the cooling fan 63 and the dust collection fan 65 in the axial direction of the output shaft 41, the cooling air W1 and the dust collection air W2 can be generated. The cooling air W1 and the dust collection air W2 blown radially outward from the fan 62 join together. The cooling air W1 and the dust collection air W2 joined together can be rectified by the rectification elements 76-1 to 76-5 and are able to flow out to the transmission mechanism 50 side.

The exhaust port 23A is arranged on the upper side of the fan 62. Furthermore, the rectification elements 76-1 to 76-5 are arranged radially outside the dust collection fan 65, and change the direction of the cooling air W1 and the dust collection air W2 into upward, in which the cooling air W1 and the dust collection air W2 are blown radially outward and toward one side in the rotation direction from the fan 62. Specifically, the rectification elements 76-1 to 76-5 include the rectification surface 76A. The rectification surface 76A is inclined upward as going toward one side in the rotation direction of the fan 62 as viewed in the radial direction of the output shaft 41. Accordingly, the cooling air W1 and the dust collection air W2 blown radially outward and toward one side in the rotation direction from the fan 62 can be guided along the rectification surface 76A. The direction of the cooling air W1 and the dust collection air W2 can be efficiently changed into upward (toward the exhaust port 23A side).

The rectification extension section 77 extending upward is provided at the upper ends of the rectification elements 76-1 to 76-3. The rectification extension section 77 includes the extension surface 77A connected to the rectification surface 76A. The extension surface 77A is arranged along the plane orthogonal to the rotation direction of the fan 62. Accordingly, a length for rectifying the cooling air W1 and the dust collection air W2 can be increased. Accordingly, the cooling air W1 and the dust collection air W2 blown upward from the rectification elements 76-1 to 76-3 are able to effectively flow upward along the extension surface 77A.

The fan guide 70 includes the guide wall 75. The guide wall 75 is arranged radially outside (rear side) the fan 62. The guide wall 75 extends along the circumferential direction of the fan 62 with the radial direction of the fan 62 as the plate thickness direction. The rectification elements 76-1 to 76-4 extend radially inward of the fan 62 from the inner peripheral surface of the guide wall 75. Accordingly, the cooling air W1 and the dust collection air W2 blown radially outward from the fan 62 are able to flow along the inner peripheral surface of the guide wall 75 toward one side in the rotation direction. That is, while the cooling air W1 and the dust collection air W2 are prevented from flowing radially outward of the fan 62 than the rectification elements 76-1 to 76-4, the cooling air W1 and the dust collection air W2 can be guided to the rectification surface 76A of the rectification elements 76-1 to 76-4. Accordingly, a decrease in the air volume of the cooling air W1 and the dust collection air W2 rectified by the rectification elements 76-1 to 76-5 can be suppressed.

The air volume of the cooling air W1 blown radially outward of the cooling fan 63 is set larger than the air volume of the dust collection air W2 blown radially outward of the dust collection fan 65. Furthermore, the lap distance d1 in the up-down direction between the rectification elements 76-1 to 76-5 and the dust collection fan 65 (dust collection air blade 65A) is set larger than the lap distance d2 in the up-down direction between the rectification elements 76-1 to 76-5 and the cooling fan 63 (cooling air blade 63A). Accordingly, the occurrence of turbulence caused by the cooling air W1 of a large air volume contacting the rectification elements 76-1 to 76-5 can be reduced, and the direction of the cooling air W1 can be changed by the rectification elements 76-1 to 76-5.

The fan guide 70 includes the partition wall 72. The space on the upper side of the fan 62 is partitioned out as the dust collection air passage 72A by the partition wall 72. Furthermore, the dust collection air passage 72A communicates with the dust collection port 22A of the housing 20, and is arranged at a position where the rectification elements 76-1 to 76-5 and the dust collection air passage 72A do not overlap in plan view. Accordingly, on the upper side of the fan 62, by the partition wall 72, interference between the dust collection air W2 flowing into the housing 20 from the dust collection port 22A and the cooling air W1 and the dust collection air W2 discharged upward from the rectification elements 76-1 to 76-5 can be reduced. That is, by the partition wall 72, the space on the upper side of the fan 62 can be partitioned into a region for supplying the dust collection air W2 to the fan 62 side and a region for exhausting the cooling air W1 and the dust collection air W2. Accordingly, the cooling air W1 and the dust collection air W2 blown upward from the rectification elements 76-1 to 76-5 are able to effectively flow to the exhaust port 23A side.

(Modification of Fan Guide 70)

Figure 9:
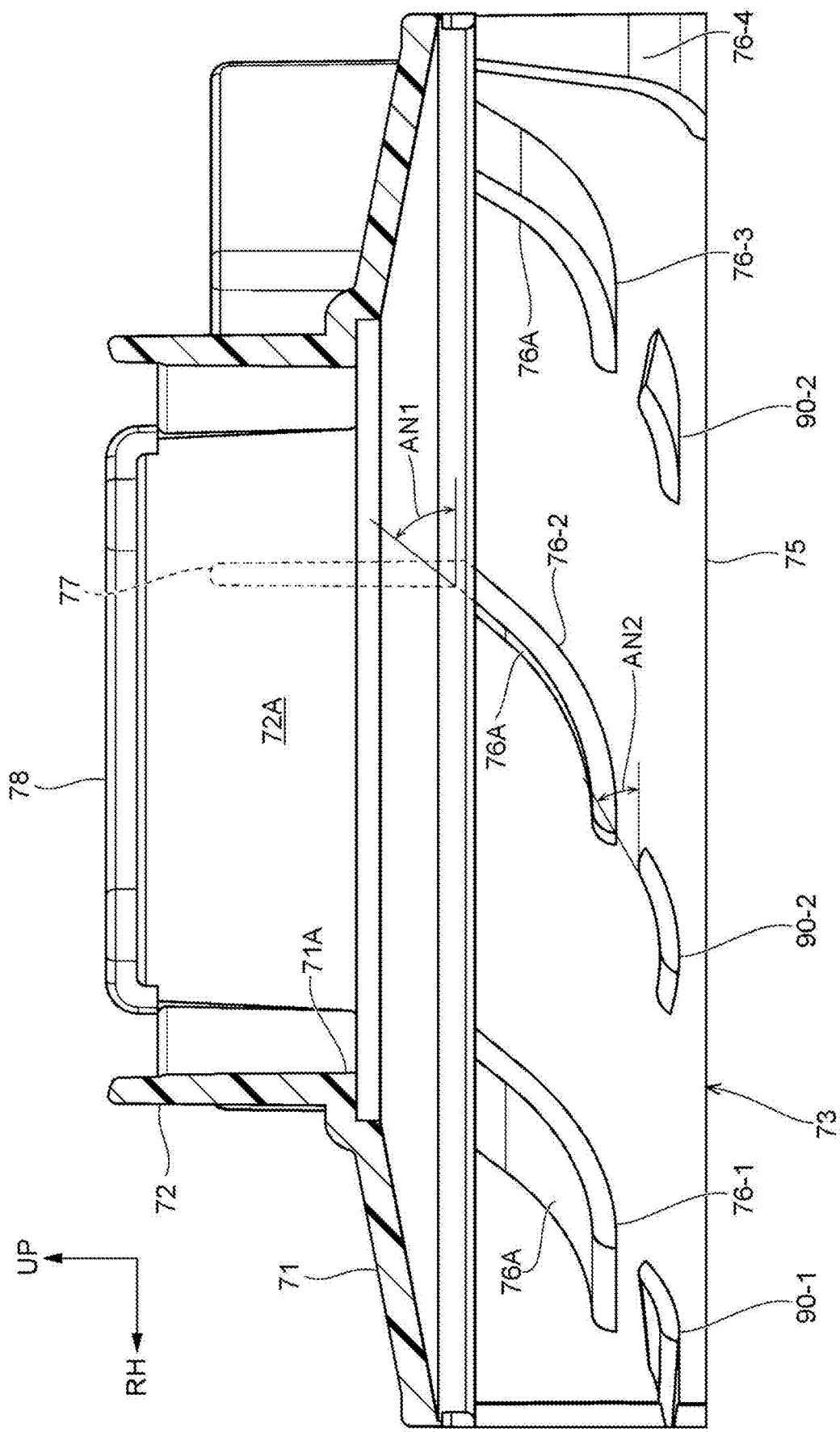
FIG. 9 is a sectional view showing a modification of the fan guide shown in FIG. 8A and FIG. 8B as viewed from the front side.

Next, a modification of the fan guide 70 is described with reference to FIG. 9. The present modification is configured in the same manner as the fan guide 70 of the present embodiment except for the points shown below. In FIG. 9, the same reference numerals are assigned to the portions configured in the same manner as the present embodiment.

That is, in the fan guide 70 of the modification, three sub rectification elements 90-1 to 90-3 as sub rectification sections are integrally formed on the inner peripheral surface of the guide wall 75 on the rear side. The sub rectification elements 90-1 to 90-3 are arranged corresponding to the rectification elements 76-1 to 76-3, respectively. Specifically, the sub rectification elements 90-1 to 90-3 are arranged on the other side in the rotation direction of the fan 62 and on the lower side of the rectification elements 76-1 to 76-3. That is, the sub rectification elements 90-1 to 90-3 are arranged radially outside the cooling fan 63.

The sub rectification elements 90-1 to 90-3 extend along a direction that is inclined upward as going toward one side in the rotation direction of the fan 62 as viewed in the radial direction of the fan 62. An extension length of the sub rectification elements 90-1 to 90-3 is set smaller than a rectification length of the rectification elements 76-1 to 76-3. An inclination angle AN1 of the upper end of the rectification elements 76-1 to 76-5 with respect to the rotation direction of the fan 62 is set larger than an inclination angle AN2 of an upper end of the sub rectification elements 90-1 to 90-3 with respect to the rotation direction of the fan 62 as viewed in the radial direction of the fan 62.

In the modification of the fan guide 70, the cooling air W1 blown radially outward from the cooling fan 63 is rectified by the sub rectification elements 90-1 to 90-3 and guided to the rectification elements 76-1 to 76-3. The cooling air W1 and the dust collection air W2 are joined together, rectified by the rectification elements 76-1 to 76-5, and blown upward from the rectification elements 76-1 to 76-5. Accordingly, similarly to the present embodiment, by utilizing the dust collection air W2 for collecting dust around the tip of the tip tool T and the cooling air W1 for cooling the motor 40 and the controller 32, the transmission mechanism 50 arranged in the upper housing section 23 can be cooled. Accordingly, the transmission mechanism 50 can be efficiently cooled.

In the modification of the fan guide 70, the inclination angle AN1 of the upper end of the rectification elements 76-1 to 76-5 with respect to the rotation direction of the fan 62 is set larger than the inclination angle AN2 of the upper end of the sub rectification elements 90-1 to 90-3 with respect to the rotation direction of the fan 62 as viewed in the radial direction of the fan 62. Accordingly, while a decrease in a wind speed at which the cooling air W1 is blown radially outward from the cooling fan 63 toward one side in the rotation direction is suppressed, the cooling air W1 can be guided to the rectification elements 76-1 to 76-5.

The heat generation section may include, in addition to the transmission mechanism 50, a circuit such as the controller 32 that generates heat during driving of the motor 40. In the present embodiment, the controller 32 is arranged in the first housing section (lower housing section 22). However, if the controller 32 is arranged in the second housing section (upper housing section 23), the circuit such as the controller 32 can also be efficiently cooled. The second housing section is not necessarily arranged above the first housing section, and may be arranged in front of, behind, to the right of, to the left of, or below the first housing section. For example, as a configuration in which the handle housing 24 arranged behind the lower housing section 22 corresponds to the second housing section, the exhaust port 23A and the controller 32 may be arranged in the handle housing 24.

For example, the present invention is configured to include: a motor; a heat generation section, generating heat by driving of the motor; a housing, including a first housing section and a second housing section, the first housing section accommodating the motor and having an air intake port and a dust collection port formed therein, the second housing section accommodating the heat generation section and having an exhaust port formed therein; a cooling fan, provided within the first housing section, and, by rotating to one side in the rotation direction, generating cooling air that flows into the first housing section from the air intake port; a dust collection fan, provided within the first housing section, and, by rotating to one side in the rotation direction, generating dust collection air that flows into the first housing section from the dust collection port; and a rectification member, provided within the first housing section, and including a rectification section in which the cooling air blown out from the cooling fan and the dust collection air blown out from the dust collection fan are rectified and flow to the exhaust port.

The cooling fan and the dust collection fan may be centrifugal fans that are fixed in an integrally rotatable manner to an output shaft of the motor and are arranged side by side in the axial direction of the output shaft.

The second housing section may be arranged on one side in the axial direction with respect to the first housing section, and the dust collection fan may be arranged on one side in the axial direction of the cooling fan. The rectification section may be arranged radially outside the output shaft with respect to at least the dust collection fan. A direction of the cooling air blown radially outward from the cooling fan and the dust collection air blown radially outward from the dust collection fan may be changed into toward one side in the axial direction.

The rectification section may be formed in a rib shape extending along a direction that is inclined to one side in the axial direction as going toward one side in the rotation direction as viewed in a radial direction of the output shaft.

A rectification extension section extending toward one side in the axial direction may be provided at one end in the axial direction of the rectification section. The rectification extension section may include an extension surface connected to the other side surface in the rotation direction of the rectification section and arranged along a plane orthogonal to the rotation direction.

The rectification member may include a guide wall. The guide wall may be arranged radially outside the output shaft with respect to the cooling fan and the dust collection fan, and may extend in the rotation direction. The rectification section may extend radially inward of the output shaft from the guide wall.

The rectification member may include a partition wall. The partition wall may partition out, as a dust collection air passage, a portion of space on one side in the axial direction with respect to the dust collection fan. The dust collection air passage may communicate with the dust collection port, and may be arranged at a position where the rectification section and the dust collection air passage do not overlap as viewed in the axial direction.

A sub rectification section may be provided radially outside the cooling fan. The sub rectification section may be arranged on the other side in the rotation direction with respect to the rectification section, and may be formed in a rib shape extending along a direction that is inclined to one side in the axial direction as going toward one side in the rotation direction as viewed in a radial direction of the output shaft.

An inclination angle of one end in the rotation direction of the rectification section with respect to the rotation direction may be set larger than an inclination angle of one end in the rotation direction of the sub rectification section with respect to the rotation direction as viewed in the radial direction of the output shaft.

A length of the rectification section in the axial direction may be set larger than a length of the sub rectification section in the axial direction.

An air volume of the cooling air blown out from the cooling fan may be larger than an air volume of the dust collection air blown out from the dust collection fan.

A dust collector may be attached to the housing. The dust collector may be configured to include: a suction section, suctioning air around a tip tool and causing the air to flow into the dust collector by the dust collection air; and a discharge section, connected to the dust collection port and causing the dust collection air inside the dust collector to flow out into the first housing section.

The heat generation section may be a transmission mechanism that transmits a driving force of the motor to a tip tool.

The invention claimed is:

1. A work machine, comprising:
    a motor;
    an output shaft, rotated by driving of the motor;
    a first fan, fixed to the output shaft and rotating integrally with the output shaft;
    a second fan, located on one side of the first fan in an axial direction of the output shaft, fixed to the output shaft, and rotating integrally with the output shaft; and a rectification member, accommodating the first fan and the second fan therein, and, in response to the output shaft rotating to one side in a rotation direction, causing a first airflow blown out from the first fan and a second airflow blown out from the second fan to join together and flow out toward one side in the axial direction, wherein the rectification member comprises:

a guide wall, which is arranged radially outside the output shaft with respect to the first fan and the second fan, and extends in the rotation direction, and a rectification section, which extends radially inward of the output shaft from the guide wall, and rectifies the second airflow so as to flow to the one side in the axial direction and is suppressed from flowing to the other side in the axial direction.

2. The work machine according to claim 1, wherein the first fan and the second fan are centrifugal fans.

3. The work machine according to claim 1, wherein the rectification section is formed in a rib shape extending along a direction that is inclined to the one side in the axial direction as going toward the one side in the rotation direction as viewed in a radial direction of the output shaft.

4. The work machine according to claim 3, wherein a rectification extension section extending to the one side in the axial direction is provided at one end in the axial direction of the rectification section; and the rectification extension section comprises an extension surface connected to the other side surface in the rotation direction of the rectification section and arranged along a plane orthogonal to the rotation direction.

5. The work machine according to claim 1, comprising:

a housing, comprising a first housing section that accommodates the motor and the rectification member and has an air intake port and a dust collection port formed therein, and a second housing section that has an exhaust port formed therein;

the rectification member comprises a partition wall, the partition wall partitioning out, as a second airflow passage, a portion of space on the one side in the axial direction with respect to the second fan; and the second airflow passage communicates with the dust collection port, and is arranged at a position where the rectification section and the second airflow passage do not overlap as viewed in the axial direction.

6. The work machine according to claim 5, wherein a dust collector is attached to the housing; and the dust collector is configured to comprise:

a suction section, suctioning air around a tip tool and causing the air to flow into the dust collector; and a discharge section, connected to the dust collection port, and causing the dust collection air inside the dust collector to flow out into the first housing section.

7. The work machine according to claim 5, wherein a transmission mechanism that transmits a driving force of the motor to a tip tool is accommodated in the second housing section.

8. The work machine according to claim 1, wherein an air volume of the first airflow blown out from the first fan is larger than an air volume of the second airflow blown out from the second fan.

9. The work machine according to claim 1, wherein the rectification member includes a plurality of the rectification sections, the plurality of the rectification sections are arranged at intervals in the rotation direction on the guide wall; and the first airflow passes between the plurality of rectification sections and flows toward one side in the axial direction, and merges with the second airflow in a region between the guide wall and the second fan in a radial direction of the output shaft.

10. A work machine, comprising:

a motor;

an output shaft, rotated by driving of the motor;

a first fan, being a centrifugal fan fixed to the output shaft and rotating integrally with the output shaft;

a second fan, being a centrifugal fan located on one side of the first fan in an axial direction of the output shaft, fixed to the output shaft, and rotating integrally with the output shaft; and a rectification member, accommodating the first fan and the second fan therein, and, in response to the output shaft rotating to one side in a rotation direction, causing a first airflow blown out from the first fan and a second airflow blown out from the second fan to join together and flow out toward one side in the axial direction, wherein the rectification member comprises a rectification section in which the second airflow is rectified so as to flow to the one side in the axial direction and is suppressed from flowing to the other side in the axial direction, wherein the rectification section is arranged radially outside the output shaft with respect to at least the second fan, and changes a direction of the second airflow into toward the one side in the axial direction; and a sub rectification section is provided radially outside the first fan; and the sub rectification section is arranged on the other side in the rotation direction with respect to the rectification section, and is formed in a rib shape extending along a direction that is inclined to the one side in the axial direction as going toward the one side in the rotation direction as viewed in a radial direction of the output shaft.

11. The work machine according to claim 10, wherein an inclination angle of one end in the rotation direction of the rectification section with respect to the rotation direction is set larger than an inclination angle of one end in the rotation direction of the sub rectification section with respect to the rotation direction as viewed in the radial direction of the output shaft.

12. The work machine according to claim 10, wherein a length of the rectification section in the axial direction is set larger than a length of the sub rectification section in the axial direction.

13. A work machine, comprising:

a motor;

an output shaft, rotated by driving of the motor;

a first fan, being a centrifugal fan fixed to the output shaft and rotating integrally with the output shaft;

a second fan, being a centrifugal fan located on one side of the first fan in an axial direction of the output shaft, fixed to the output shaft, and rotating integrally with the output shaft; and a rectification member, accommodating the first fan and the second fan therein, and, in response to the output shaft rotating to one side in a rotation direction, causing a first airflow blown out from the first fan and a second airflow blown out from the second fan to join together and flow out toward one side in the axial direction, wherein
the rectification member comprises a rectification section arranged radially outside the output shaft with respect to at least the second fan and formed in a rib shape extending along a direction that is inclined to the one side in the axial direction as going toward the one side in the rotation direction as viewed in a radial direction of the output shaft.

* * * * *